United States Patent [19]

Uziie et al.

[11] Patent Number: 5,424,873
[45] Date of Patent: Jun. 13, 1995

[54] LENS CENTERING APPARATUS

[75] Inventors: Seiji Uziie; Kazuyoshi Azegami; Hiroshi Nomura, all of Tokyo, Japan

[73] Assignee: Asahi Kogaku Kogyo Kabushiki Kaisha, Tokyo, Japan

[21] Appl. No.: 157,816

[22] Filed: Nov. 24, 1993

[30] Foreign Application Priority Data

Dec. 7, 1992 [JP] Japan .................. 4-326582

[51] Int. Cl.[6] ........................... G02B 7/02
[52] U.S. Cl. ................. 359/813; 359/829; 359/819; 359/827
[58] Field of Search .......... 359/694, 819, 823, 825, 359/827, 829, 700, 703, 813

[56] References Cited

U.S. PATENT DOCUMENTS

| | | | |
|---|---|---|---|
| 4,582,350 | 4/1986 | Okajima | 359/829 |
| 4,759,618 | 7/1988 | Kamata | 359/703 |
| 5,182,674 | 1/1993 | Notagashira et al. | 359/825 |
| 5,191,478 | 3/1993 | Horiguchi et al. | 359/825 |

FOREIGN PATENT DOCUMENTS 0344806 12/1989 European Pat. Off. ........... 359/700

*Primary Examiner*—Loha Ben
*Assistant Examiner*—Suma N. Ramaswamy
*Attorney, Agent, or Firm*—Kane, Dalsimer, Sullivan, Kurucz, Levy, Eisele and Richard

[57] ABSTRACT

A lens centering apparatus of a lens barrel having therein a lens supporting frame includes male threads provided on an outer periphery of the lens supporting frame, and female thread sets provided on the lens barrel and having different centers. The female thread sets can be selectively engaged by the male threads of the lens supporting frame.

6 Claims, 5 Drawing Sheets

LENS CENTERING APPARATUS

BACKGROUND OF THE INVENTION

1. Field of the Invention

The present invention relates to a centering apparatus of a lens supported in a lens frame which is threadedly engaged with a threaded portion formed on an inner peripheral surface of a lens barrel.

2. Description of Related Art

In a known lens barrel of a camera which is provided with, for example, front and rear lens groups which are movable relative to one another in an optical axis direction, the front lens group is held by a lens frame which is provided on an outer peripheral surface thereof with a male threaded portion (i.e., crest) which is engaged by a corresponding female threaded portion (i.e., groove) formed on an inner peripheral surface of the front end of the lens barrel. However, in such a holding structure, alignment of the center axis of the female threaded portion of the lens barrel, or the center axis of the male threaded portion of the lens frame, with the center axis (i.e., optical axis) of the lens supported by the lens frame does not necessarily ensure alignment of the optical axes of the front and rear lens groups. Various arrangements hitherto have been directed to increasing the precision of the front and rear lens group support by increasing the mechanical precision of the lens barrel. However, a direct and mechanical adjustment (i.e., centering.) of the lens frame center axis has not been proposed.

SUMMARY OF THE INVENTION

It is an object of the present invention to provide a simple lens centering apparatus for mechanically adjusting the center axis of the lens or lenses.

To achieve the object mentioned above, according to the present invention, a lens centering apparatus of a lens barrel having therein a lens supporting frame is provided. The apparatus includes male threads provided on an outer periphery of the lens supporting frame, and a plurality of female threads provided on an inner periphery of the lens barrel, wherein the female threads have different centers, and wherein the female threads are selectively engaged with the male threads of the lens supporting frame.

Preferably, the female threads include a plurality of threads provided on the inner periphery of the lens barrel at a substantially constant pitch. Similarly, the male threads on the lens supporting frame are comprised of a plurality of threads spaced at a substantially constant pitch in the circumferential direction.

The male threads are provided on radial and helical projections of said lens supporting frame.

According to another aspect of the present invention, a lens centering apparatus of a lens barrel having therein a lens supporting frame comprises a set of more than three radially projecting helical male threads provided on an outer peripheral surface of the lens supporting frame at a substantially equiangular distance, and sets of more than three female threads provided on an inner periphery of the lens barrel for selectively engaging with male threads of the lens supporting frame, wherein the sets of female threads include a set of threads having a center located on a center of the lens barrel and a plurality of sets of threads having centers offset from the center of the lens barrel.

Preferably, the offset centers are located around the center of the lens barrel at a substantially equiangular distance.

The present disclosure relates to subject matter contained in Japanese patent application No. 4-326582 (filed on Dec. 7, 1992) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 5:
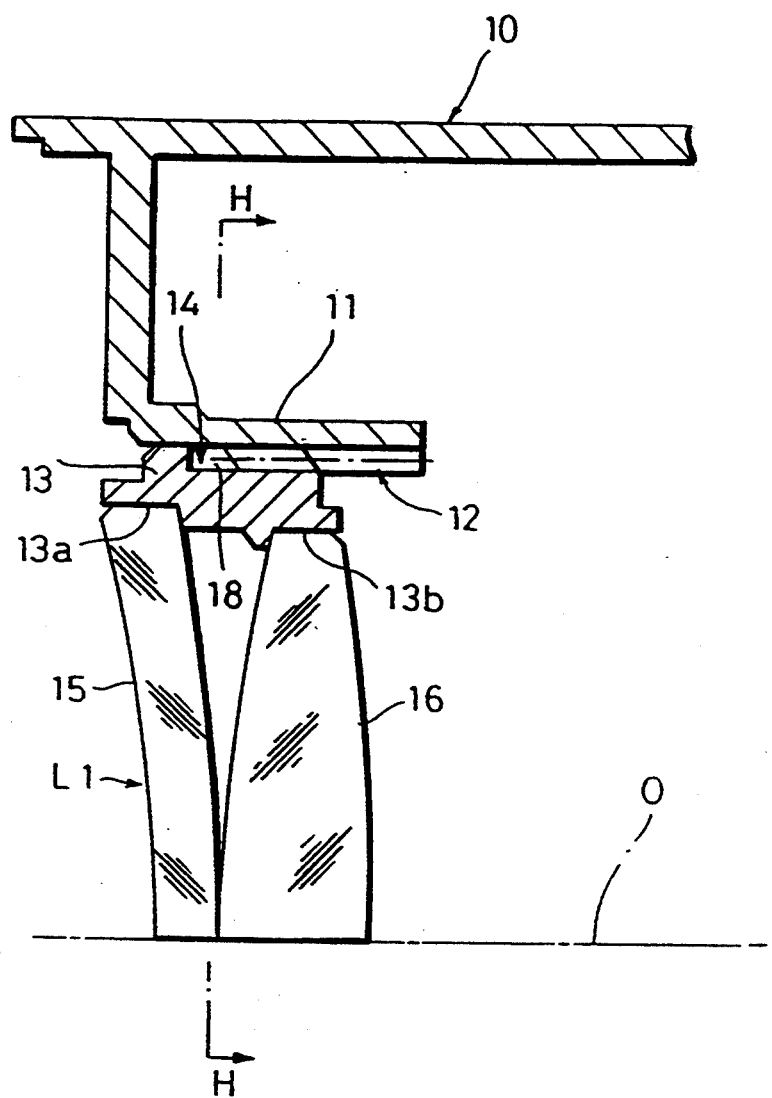

FIG. 5 shows an enlarged sectional view of a front end of a lens barrel 10 of a camera to which a lens centering apparatus of the present invention is applied. The lens barrel 10 is provided with a cylindrical portion 11 on a front and inner peripheral surface thereof to support a lens frame 13, as shown in FIG. 5. The cylindrical portion 11 is provided on an inner peripheral surface thereof with a female threaded portion 12 which is in mesh with a male threaded portion 18 formed on an outer peripheral surface of the lens frame 13. The lens frame 13 has annular supports 13a and 13b formed on the inner surface thereof for supporting lenses 15 and 16, which constitute a front lens group L1. A rear lens group (not shown) is provided optically behind the front lens group L1. The front and rear lens groups together constitute a photographing optical system.

In this embodiment, the male threaded portion 18 is comprised of three male threads and the female threaded portion 12 comprises, as can be seen in FIGS. 1 through 4, a plurality of female thread sets 12A through 12G having different centers. Female thread sets 12A through 12G are each comprised of 3 threads spaced apart from each other at an angular distance of 120°. The male threads of the male threaded portion 18 of the lens frame 13 can be threadedly engaged in any of the female thread sets 12A through 12G.

Figure 1:
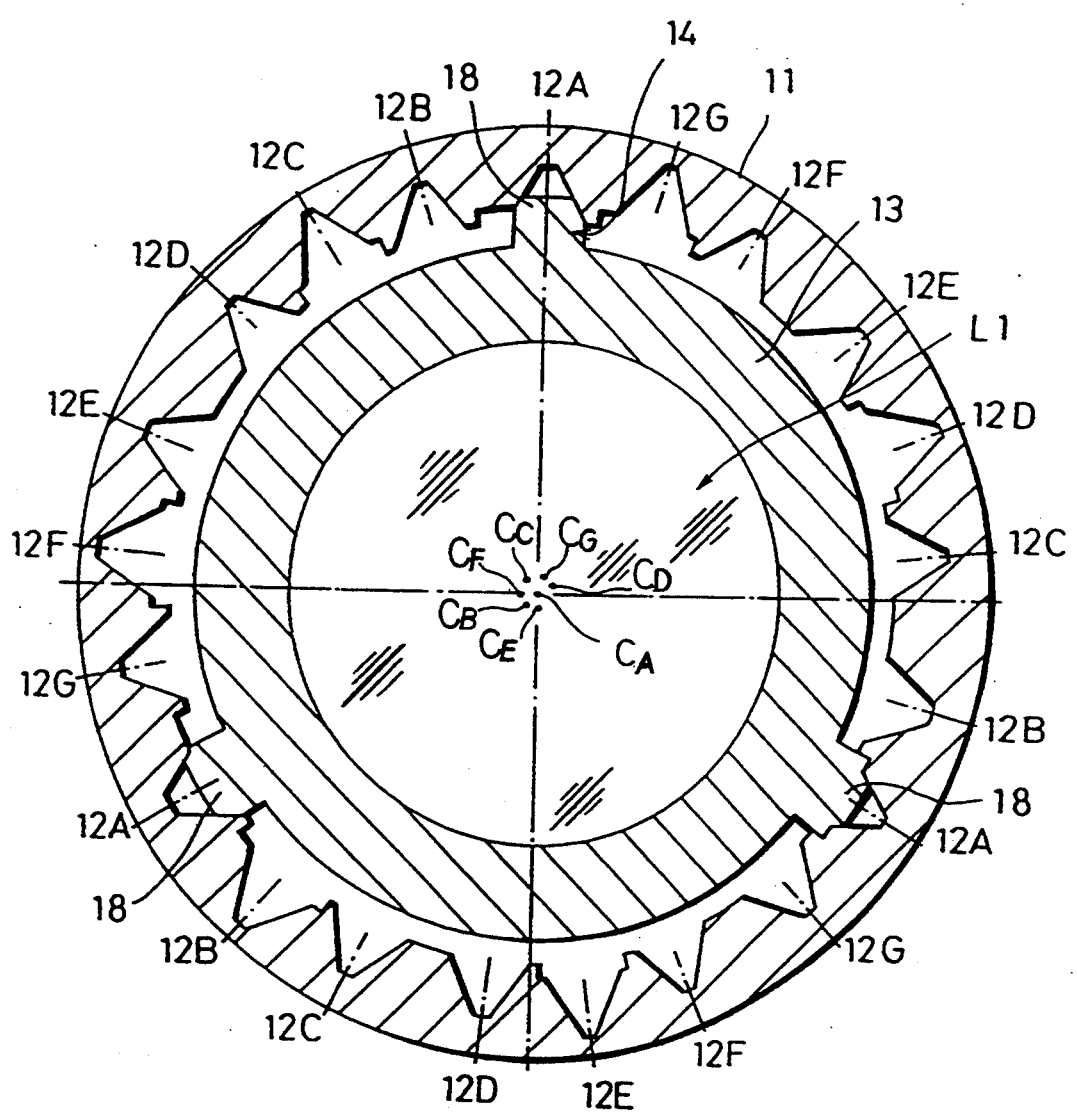
FIGS. 1, 2 and 3 are sectional views of a lens centering apparatus in which a multiple male thread of a lens supporting frame are engaged in different multiple female threads of a lens barrel, along the line H—H in FIG. 5, according to the present invention.

The first female thread set 12A has a center $C_A$ located at the center of the cylindrical portion 11 and, accordingly, the center of lens barrel 10. The remaining thread sets 12B through 12G have respective centers $C_B$, $C_C$, $C_D$, $C_E$, $C_F$, $C_G$, that are offset from the center of the cylindrical portion 11. These offset centers $C_B$, $C_C$, $C_D$, $C_E$, $C_F$, $C_G$, are located around the center of the cylindrical portion 11, as shown in FIG. 1.

The three projections of the male threaded portion 18 of the lens frame 13 are formed on three radially protruding helical projections 14 provided on the outer peripheral surface of the lens frame 13 and spaced from one another in the circumferential direction at an angular distance of 120°. The male threads 18 can be selectively engaged in the respective female thread sets 12A through 12G. The independent female thread sets 12A through 12G are located at different circumferential positions and have different centers. Accordingly, male threads 18 can be selectively engaged in the female thread sets 12A through 12G.

Upon assembly or maintenance of the lens barrel 10, the lens centering apparatus as constructed above, according to the present invention, operates as follows.

The lens frame 13 which supports the front lens group L1 is disposed in the front end of the lens barrel 10 (i.e., cylindrical portion 11) and the male threads 18 of the lens frame 13 are engaged in the set of the female thread sets 12A of the cylindrical portion 11. In this position, when the lens frame 13 is rotated to move inwardly (for example, in the clockwise direction in FIG. 1), rearward movement of the lens frame 13 in the direction of the optical axis 0 takes place while the three helical projections (i.e., male threads) 18 are guided in and by the three respective helical thread grooves (i.e., female thread sets) 12A. During the axial movement of the lens frame 13, the center of the latter (i.e., front lens group L1) is located at $C_A$.

Figure 2:
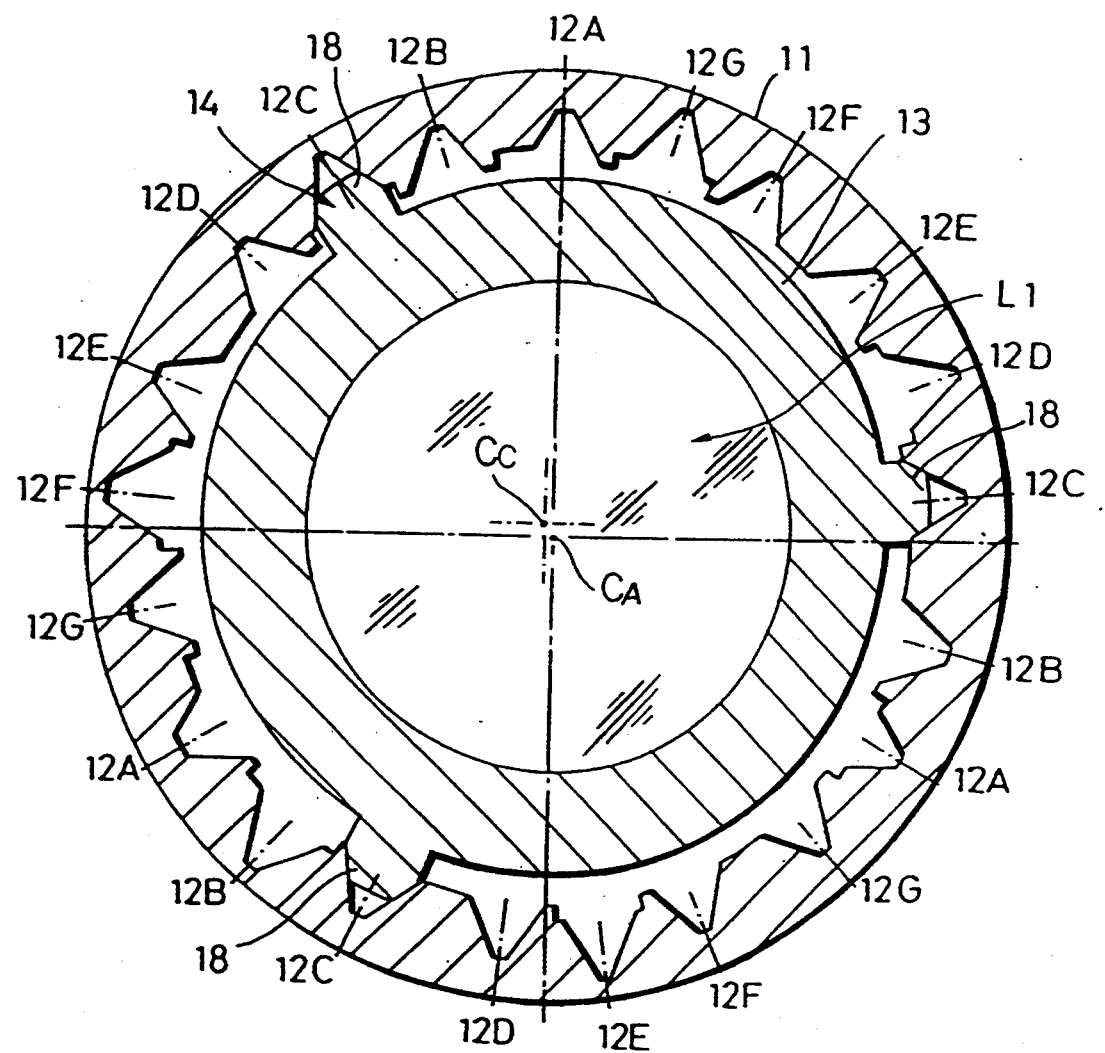

In this state, optical properties or functions of the photographing optical system are examined. As a result of the examination, if the center of the front lens group L1 is inappropriate, the lens frame 13 is rotated in the opposite direction (for example, in the counterclockwise direction) to detach the lens frame 13 from the cylindrical portion 11 (i.e., lens barrel 10). Thereafter, the three male threads 1ib of the lens frame 13 are engaged, for example, in the three respective female thread sets 12C of the cylindrical portion 11. Thereafter, when the lens frame 13 is again rotated inwardly (for example, in the clockwise direction), rearward displacement of the lens frame 13 in the optical axis direction O occurs while the male threads 18 are guided in the associated female thread sets 12C, Consequently, the center of the front lens group L1 is moved from the position $C_A$ to the position $C_C$ which is offset from the center $C_A$ by a predetermined deviation in the radial direction, as can be seen in FIG. 2.

Figure 3:
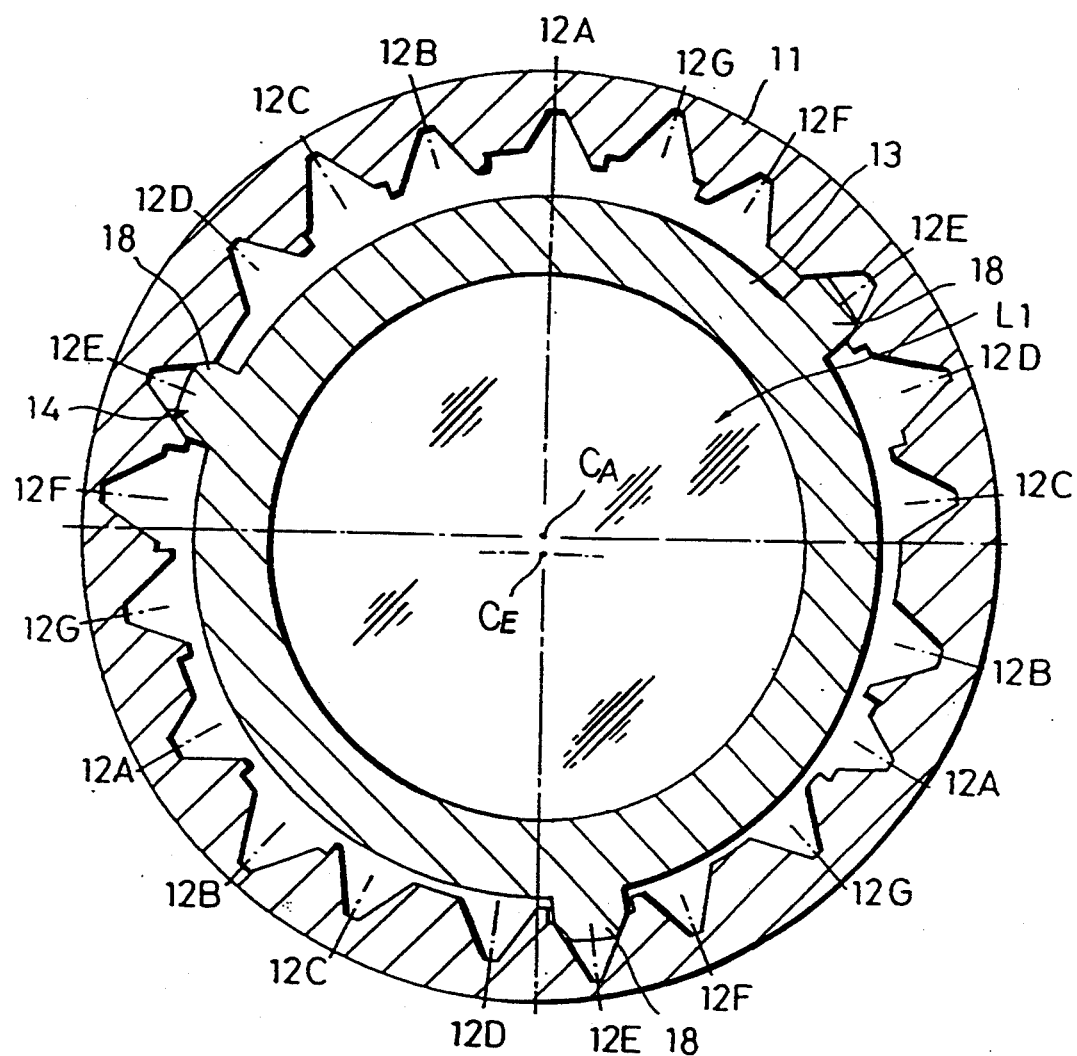
Figure 4:
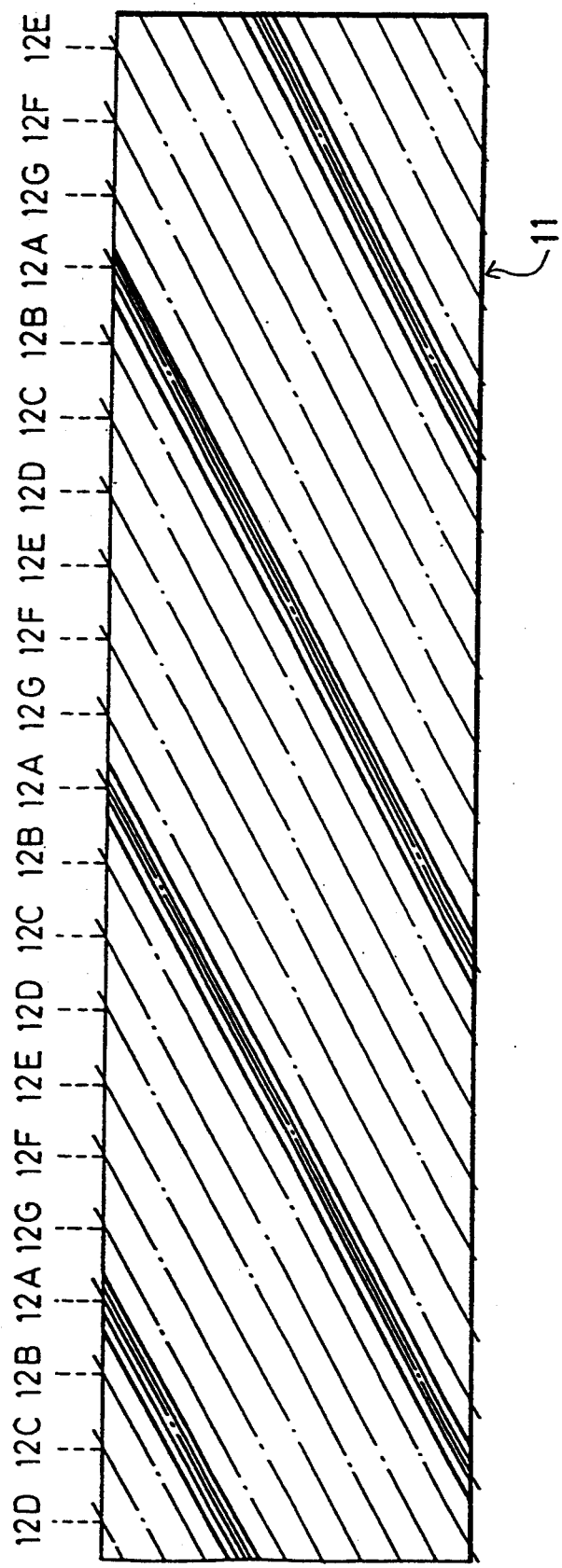
FIG. 4 is a developed view of multiple female threads of a lens centering apparatus, according to the present invention; and, FIG. 5 is an enlarged sectional view of a front end of a lens barrel in a lens centering apparatus, according to the present invention.

In this state, the optical properties or functions of the photographing optical system are again examined. If the result is still insufficient, the above mentioned adjustment is repeated. Namely, the lens frame 13 is rotated in the counterclockwise direction and detached from the cylindrical portion 11 (i.e., lens barrel 10). Thereafter, the three male threads 18 of the lens.; frame 13 are engaged, for example, in the three respective female thread sets 12E of the cylindrical portion 11. The lens frame 13 is then rotated again in the inward direction (for example, in the clockwise direction), so that the rearward displacement of the lens frame 13 in the optical axis direction O takes place while the male threads 18 are guided in the associated female thread set 12E. Consequently, the center of the front lens group L1 is moved from the position $C_C$ to the position $C_E$ which is offset from the center $C_A$ by a predetermined amount in the radial direction, as can be seen in FIG. 3.

The above mentioned adjusting operations are repeated until the optical properties or functions of the photographing optical system is satisfactory. When an optimal center of the front lens group L1 is obtained, the lens frame 13 is secured to the cylindrical portion 11, for example, by an adhesive at an appropriate axial position thereof.

Thus, an optimum center position of the front lens group L1 can be easily obtained by selectively engaging the (three) male threads 18 in the corresponding female thread sets 12A through 12G of the cylindrical portion 11. The offset centers $C_B$ through $C_G$, which are preferably spaced at a substantially equiangular distance in the circumferential direction of the lens frame 13 about the lens center $C_A$, allow for the adjustment of the center of the front lens group L1 in any direction. Optical axis position of the lens L1 is adjustable by changing the treading length of one of the female thread sets 12A through 12G. Upon completion of both centering and optical axis position adjustment of the lens L2, the lens frame 13 is secured to the cylindrical portion 11 by, for example, an adhesive.

In the above mentioned emobodiments, the male threaded portion 18 and female thread sets 12A through 12G are comprised of multiple threads (i.e., three threads). It should be noted that the number of threads of the male threaded portion 18 or the female thread sets 12A through 12G which are used depends on a lead angle of the thread. In theory, if the lens frame 13 and the cylindrical portion 11 has enough axial length, a single thread can be used for the male threads 18 and the corresponding female thread set. In practice, however, the lens frame 13 and the cylindrical portion 11 is unlikely to have sufficient axial length. Accordingly, multiple thread arrangements are preferred.

As can be seen from the above discussion, according to the present invention, since a plurality of female thread sets, having different centers in which the male threads formed on the outer peripheral surface of the lens barrel can be selectively engaged, are provided on the inner peripheral surface of the lens barrel, the centering of the lens can be easily andprecisely effected by a simple centering apparatus.

We claim:

1. A lens centering apparatus, comprising:
   a lens supporting frame for supporting a lens;
   a lens barrel that supports said lens supporting frame;
   at least one male thread provided on an outer periphery of said lens supporting frame;
   a plurality of female threads provided on an inner periphery of said lens barrel, said female threads having centers radially offset from one another with respect to said lens barrel center, wherein a selected one of said female threads is selectively engaged with said at least one male thread of said lens supporting frame to radially position said lens with respect to said lens barrel center.

2. The lens centering apparatus of claim 1, wherein more than one male thread is provided, and wherein said plurality of female threads are grouped in sets that correspond to said more than one male thread.

3. The lens centering apparatus of claim 2, wherein said male threads on said lens supporting frame are comprised of a plurality of threads spaced at a substantially constant pitch in the circumferential direction.

4. The lens centering apparatus of claim 3, wherein said male threads are provided on radial and helical projections of said lens supporting frame.

5. A lens centering apparatus of a lens barrel having therein a lens supporting frame, comprising:
   a set of more than two radially projecting helical male threads provided on an outer periphery of said lens supporting frame at a substantially equiangular distance; and,
   sets of more than two female threads provided on an inner periphery of said lens barrel each of said sets of female threads being adapted to selectively engage with said male threads of said lens supporting frame, wherein said sets of female threads include a set of threads having a center located on a center of said lens barrel and a plurality of sets of threads having centers radially offset from the center of said lens barrel.

6. The lens centering apparatus of claim 5, wherein said offset centers are located around the center of said lens barrel at a substantially equiangular distance.

* * * * *